3,185,489
ANNULAR SEALING ELEMENTS
Hubert Klinger-Lohr, Modling, Austria, assignor to Istag A.G. Suhr/AG, Suhr, Aargau, Switzerland
Filed June 5, 1963, Ser. No. 285,631
12 Claims. (Cl. 277—100)

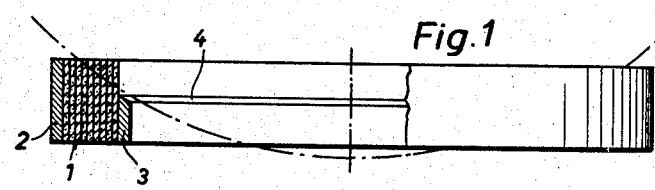
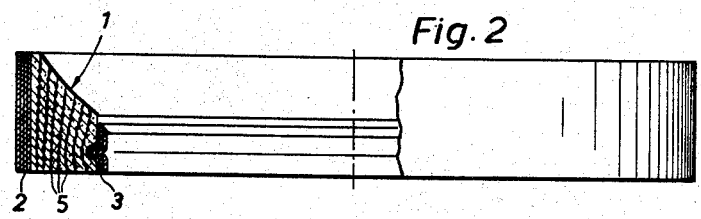
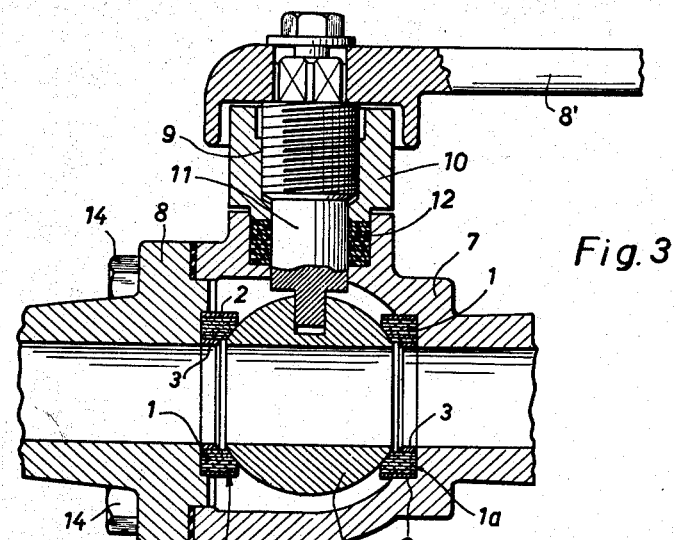
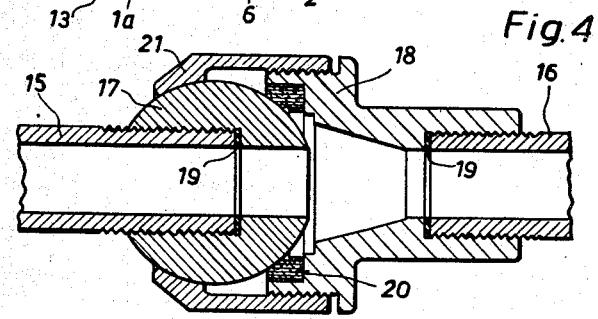

The invention relates to annular sealing elements. When two rigid conduit parts are to be connected for relative rotation and sealed together, usually one conduit part is provided with a ball-shaped end member at the point of connection with the other part, around the center of which rotation can occur. The joint between the ball-shaped part and the adjacent conduit part is effected by an annular sealing element which seals between the spherical counter-surface of one conduit part, turning about its center and the counter-surface of the other adjacent conduit part.

For such sealing problems, which for example occur with cocks having ball-shaped plugs, or hinged pipe-joints, normally exchangeable, elastic sealing elements, made of rubber in one piece, or of a thermoplastic synthetic material are used having end faces sealingly engaging the counter-surfaces. The disadvantage of such sealing elements is that an expensive matrix is required for the fabrication of each size, and that they can only be utilized up to specific and relatively low operating temperatures, on account of the available materials.

It is known to utilize non-elastic materials, such as fibrous materials for sealing elements in which the element has a concave end face as a sealing surface engaging the ball-shaped counter-surface. However, the second sealing surface of the sealing element is thereby formed by its outer surface. The sealing effect is therefore obtained by wedging the element into the annular wedge-shaped groove which extends between the ball-shaped surface and the hollow cylindrical counter-surface. The sealing material must be relatively soft, in order to achieve a sealing effect, when it is pressed into the annular wedge-shaped groove; the required softness of the sealing element creates the disadvantage of inflicting relatively heavy wear on the surface of the ball-shaped counter-surface on which tangential forces arise, due to the rotation of the ball, whereby the working life of the element is reduced. Furthermore, the storage of these elements in finished condition and the mounting thereof, is difficult, because they are easily deformed on account of their softness, thus demanding careful handling, in addition to which the material can sinter when being pressed as required.

An object of the present invention is to provide a sealing element of the above mentioned character, which however, can be easily mounted and dismantled, produced simply and inexpensively, without tools depending on size, and possessing good operating characteristics.

The invention is based on the fact that it is possible to produce heat and wear resistant sealing elements which seal only with their end surfaces, if a radially compressed annular wrapped packing is utilized for sealing, comprising a non-combustile resiliently-bonded fibre strip, although the fibre content renders the strip practically non-elastic. Actually, this could be achieved, when an annular wrapper packing of the mentioned fibrous material is inserted in a recess of the part provided with the immovable counter-face. The difficulty of such a procedure lies in the fact, that for sufficiently strong radial compression of the packing, this latter must be forced into the annular groove-shaped recess under high pressure, which leads to deformation of the sealing element, and accordingly to leakage. Furthermore, in such an arrangement, the removal of a used packing which has been subjected to a high temperature is relatively difficult, because the packing bakes together and sticks in the annular recess, and the necessary cleaning of the counter surface can lead to its damage.

According to the invention, an annular sealing element adapted to form a seal between two opposite surfaces, one of which is fixed relatively to the element and the other is a spherical surface which is rotatable about its center relative to the element, comprises an annular wrapper packing disposed concentrically to the axis of the annular element and formed of a strip of resiliently bonded non-combustible fibres, said packing being radically compressed by metallic sheath ring members provided on the outer and the inner cylindrical surfaces of the annular packing, whereby only the two end faces of the packing form sealing surfaces coacting with the said opposite surfaces to be sealed.

More particularly, the invention contemplates the provision of an annular sealing element for forming a seal between the surface portions of two opposed members wherein one of the members is fixed relative to the annular sealing element and the other has a spherical surface portion rotatable about its center relative to the annular sealing element, the annular sealing element including a major axis and comprising an annular wrapper packing of layers of a strip of resiliently bonded non-combustible fibers wound concentrically about the major axis for forming a ring. This ring includes inner and outer circumferential periphery and first and second end faces. Moreover, there is provided an inner sheath ring fitted within said annular wrapper packing for abutting said inner circumferential periphery and including end faces and an outer sheath ring fitted about said annular wrapper for abutting said outer circumferential periphery. The diameters of said inner and outer sheath rings are such that the annular wrapper packing is subjected to radial compression and the height of said inner and outer sheath rings being such that only the first and second end faces of the annular wrapper packing can contact the surface portions of the two opposed members.

In the sealing element of the present invention, the following advantages are obtained owing to the insertion of the packing or package between two metallic ring members. First when mounting the elements, the single windings of the package can be compressed against each other in such a manner, that the mixture of non-combustible fibres and elastic binding material will be even more compressed on the end faces of the packages and therefore under high temperatures offers both the necessary sealing capacity on the opposite surfaces and excellent wear resistance against the tangential forces of the spherical counter-surface which slides over the element. Second, owing to the metallic annular sheath of the package, the sealing element can be centered exactly and without forcing in the part provided with the fixed surface, so that both end surfaces of the element may be machined prior to mounting corresponding to the surfaces to be sealed, and inserted afterwards.

The sealing elements of the present invention accordingly are extremely resistant against wear by the spherical surface sliding thereon also at high temperatures because the metallic sheath rings impart the necessary consolidation of the wound elastic strip of non combustible fibres, and the required strength against deformation prior to the insertion of the element. The fibres which can be utilized are asbestos, glass or mineral wool and the like. These fibres may be bonded by synthetic or natural rubber, or by resilient plastic materials, as long as they yield a strip of material which may be formed in windings.

Since the metallic sheath imparts the necessary stability of shape to the sealing element, there is no danger of damaging the surfaces to be sealed. In order to increase the wear resistance it is possible to insert foils, grids or screens of a material which does not attack the surfaces, for example of nickel or aluminium in the sealing-strip, or between adjacent windings of the package. The metal sheath of the sealing element may be formed of band material which may be provided with a longitudinal corrugation in order to increase the resiliency of the ring sheath. The sheath may also have securing means for example a screw thread.

When making the sealing element according to the invention, the ring sheaths must be joined to the package windings, while radially compressing the same. For this purpose the inner ring sheath is first mounted on a mandrel, then the sealing strip is secured to the ring or to the mandrel and wound upon the ring by means of roller exerting pressure directed radially towards, the winding axis, whereafter the second ring sheath is fixed externally to the package.

At least one of the ring sheaths can be formed by several windings of a metal band, the windings thereof being connected together; the connection with the sealing package is achieved by overlapping the corresponding end of the metal band with one end of the sealing strip. It is also possible, however, to connect one or both ring sheaths by pressing them on or into the sealing package.

The present invention will now be described with reference to the accompanying drawings, in which, FIG. 1 is an axial section of an unfinished sealing element in accordance with the invention, in which the package of sealing material is inserted between two one piece sheath ring member;

FIG. 2 is an axial section of another finished sealing element in accordance with the invention, which is composed of wound members only;

FIG. 3 represents a pipe-joint in longitudinal section with a sealing element in accordance with the invention;

FIG. 4 is an axial section of a tap fitted with a ball-shaped plug provided with a sealing element in accordance with the invention.

According to FIGURE 1 the sealing element comprises a package 1 of strip-shaped sealing material having substantially plane surfaces. The package 1 is pressed into the space between an outer sheath ring 2 of the height of the package and an inner sheath ring 3 which in comparison to the outer sheath ring 2, is of less height so that the package is subjected to the required radial compression. The sealing strips which form the package preferably are not thicker than 3 to 4 mm. The thickness naturally depends on the size of the element, because it should only be a fraction of the height of the package. The strip can either be cut out of a sheet of non-combustible fibres bonded with an elastic binder e.g. rubberized asbestos, or prepared initially in strip form.

One end surface of the package 1 and of both sheath rings is situated in a plane which is destined to abut against a fixed counter-surface. If it will be necessary for obtaining the required seal at this counter-surface, the ends of the two sheath rings may not extend up to the end face of the package. The opposite end surface 52 of the package, destined to seal against the spherical surface of the counter part, is not yet spherically curved (as indicated by the dot and dash line). This can be achieved, either by turning or by indenting with a ball-shaped object advantageously in the presence of heat. However, precautions must be taken that the ball does not abut against one of the sheath rings, but a small amount of play must be allowed, at least with respect to the inner sheath ring 3, so that the ball presses only against the sealing package. For this purpose the end face 4 of the inner sealing ring 3, which is directed towards the spherical sealing surface, is conically bevelled whereby the inclination of this conical surface, as seen in a radial plane, is practically the same as the inclination formed by the spherical portion of the sealing surface at the inner circumference of the sealing package. The sheath rings are thus secured tightly on the sealing package and the unit as a whole is easy to manipulate.

The sealing element shown in FIGURE 2 is produced entirely by coiling strips of material, a metal strip of sufficient strength, such as a steel tape is utilized for forming both inner and outer sheath rings. First, a length of metal band is wound around a core, and the individual windings are connected together, for example by welding, to form an inner sheath ring 3, then a sealing strip is wound on the inner sheath ring 3 to form the sealing package 1, the end of the sealing strip overlapping the end of the metal band of the ring 3, a pressure roller acting against the winding core imparting the required compression to the package. Another length of metal-band is wound thereafter on the sealing strip, to form the outer sheath ring 2. Between the windings of the sealing strip a nickel wire mesh strip 5 is fitted to increase the resistance against wear. The spherically curved recess of one of the end surfaces in this case, can only be produced by turning or grinding and if necessary, the opposite plane end surface can also be machined. The inner sheath ring 3 is turned advantageously down to a height which is a little less than the height of the inner circumferential surface of the sealing package 1, so that the ball-shaped member can only come into contact with the spherically curved sealing surface. The inner sheath ring is formed by winding a longitudinally corrugated metal band; accordingly the sealing strip wound thereon, and the inserted mesh strip also receive a longitudinal curvature, so that the complete unit offers increased elasticity. Naturally, it is also possible to form either one or both sheath rings as a single piece. Also in this case precautions must be taken so that the inner sheath ring 3 is lower than the inner circumferential surface of the sealing package 1.

The cock shown in FIGURE 3 has a ball-shaped plug 6 which can be turned by means of an operating handle 8 secured to a driver pin 11 which is provided with a screw threaded portion 9 screwing into an upper part 10 of the cock housing 7. The bolt 11 is sealed by a stuffing-box packing 12 inserted in the housing 7 and compressed by the upper part 10. The ball valve 6 is mounted coaxially to the direction of flow between two sealing elements 1a, one of which is located in the housing 7, and the other in a flanged conduit portion 8, closing the opening of the housing 7 for the ball valve 6.

A plane gasket 13 is arranged between the housing 7 and the flanged portion 8 which is secured by screws 14 to the housing 7. The permissible variations in the manufacture of the ball 6, the housing 7, the flanged conduit portion 8 and the gasket 13 are compensated by the sealing element 1a. When the sealing packages 1 are so designed, that they are compressed even in the most unfavourable condition, but on the other hand remain elastically yielding so as to be compressible within the tolerance limits, then the sheath rings 2, 3 require only a small clearance against the ball 6, so that the material of the package 1 is only compressed but is not squeezed out through the slits between the ball 6 and the adjacent edges of the sheath rings 2, 3. In this manner, the sealing material of the elements 1a is urged against the ball with internal pre-stress, so that the minor wear which occurs when the ball is turned about the axis of the pin 11, does not deteriorate the efficiency of the sealing effect, during long periods of operation. When utilizing practically non-elastic sealing elements, the elasticity of which is insufficient for compensating the tolerances of manufacture, then the sealing element located at the side of the flanged conduit portion 8 may be arranged in a screw ring, or the outer sheath ring is provided with an external screw thread and a supporting flange and sealingly fitted in the housing 7 by means of an internal thread so that when the screw threaded ring or the sealing element is turned the latter can be adjusted with respect to the other element. In this manner, the required pressure against the ball can be obtained independently of the elasticity of the elements.

As it will be seen from the drawings the described sealing elements have the advantage, that they can easily be removed from the housing. After a certain period of operation the sealing element will stick to its seat but since it makes contact with the housing along its front face, only, the removal of the element and the cleaning of its seal is simple.

FIG. 4 shows a pipe joint. Pipe joints of this type are usually mounted for example, in steam feeding pipes for multi-stage presses. A ball 17 is screwed upon one end of a pipe 15 to be connected to a pipe 16, a counterpart 18 is screwed to the end of the pipe 16, and plane gaskets 19 are inserted between the pipe ends and said ball and counterpart, respectively. A sealing element 20 according to the invention is mounted in the counterpart.

A ring member 21 is screwed to the counterpart 18 and is provided with a spherically curved annular surface coacting with the ball 17 to urge the ball against the sealing element, and this latter against its seat in the counterpart. By screwing the ring member 21 more or less on the counterpart 18, it is possible to obtain a suitable contact pressure between the sealing element and the ball surface, so that on the one hand, a good sealing effect and on the other hand, an easy angular adjustment of both pipes is obtained.

I claim:

1. An annular sealing element for forming a seal between the surface portions of two opposed members wherein one of the members is fixed relative to the annular sealing element and the other has a spherical surface portion rotatable about its center relative to the annular sealing element, the annular sealing element including a major axis and comprising an annular wrapper packing of layers of a strip of resiliently bonded non-combustible fibres wound concentrically about said major axis for forming a ring including inner and outer circumferential peripheries and first and second end faces, an inner sheath ring fitted within said annular wrapper packing for abutting said inner circumferential periphery and an outer sheath ring fitted about said annular wrapper packing for abutting said outer circumferential periphery, the diameters of said inner and outer sheath rings being such that said annular wrapper packing is subjected to radial compression and the height of said inner and outer sheath rings being such that only the first and second end faces of said annular wrapper packing can contact the surface portions of the two opposed members.

2. An annular sealing element as claimed in claim 1, in which the end face of the inner sheath ring adjacent to the spherical surface portion is inwardly bevelled.

3. An annular sealing element as claimed in claim 1 in which at least one of said sheath ring is formed by a coiled metal band.

4. An annular sealing element as claimed in claim 3, in which said coiled metal band includes an annular corrugation.

5. An annular sealing element according to claim 1, in which at least one of the sheath rings is provided with a screw thread for forming a fastening means for the annular sealing element.

6. An annular sealing element as claimed in claim 1, in which said annular wrapper packing includes wear resistant inserts between adjacent layers.

7. An annular sealing element as claimed in claim 6 wherein said inserts are of metallic foil.

8. An annular sealing element as claimed in claim 6 wherein said inserts are of aluminum foil.

9. An annular sealing element as claimed in claim 6 wherein said inserts are of nickel foil.

10. An annular sealing element as claimed in claim 6 wherein said inserts are of wire mesh.

11. An annular sealing element as claimed in claim 6 wherein said inserts are of aluminum wire mesh.

12. An annular sealing element as claimed in claim 6 wherein said inserts are of nickel wire mesh.

References Cited by the Examiner

UNITED STATES PATENTS

| | | | |
|---|---|---|---|
| Re. 23,782 | 2/54 | Patterson | 277—235 |
| Re. 24,102 | 12/55 | Ohls | 251—317 |
| 529,831 | 11/94 | Peckham et al. | 277—234 X |
| 1,784,381 | 12/30 | O'Stroske | 251—315 |
| 1,942,703 | 1/34 | Hubbard et al. | 277—204 |
| 2,255,504 | 9/41 | Current | 277—233 |
| 2,635,330 | 4/53 | Fentress | 29—455 X |
| 2,745,173 | 5/56 | Janus | 29—455 |
| 2,867,035 | 1/59 | Patterson | 29—455 |

LEWIS J. LENNY, *Primary Examiner.*

EDWARD V. BENHAM, *Examiner.*